United States Patent
Sun

(10) Patent No.: US 10,203,118 B2
(45) Date of Patent: *Feb. 12, 2019

(54) REMOVABLE APPARATUS TO REGULATE FLAME HEAT TRANSFER AND RETAIN DRIPPING LIQUID SUBSTANCE FOR A GAS STOVE BURNER

(71) Applicant: Yizhong Sun, Castaic, CA (US)

(72) Inventor: Yizhong Sun, Castaic, CA (US)

(*) Notice: Subject to any disclaimer, the term of this patent is extended or adjusted under 35 U.S.C. 154(b) by 1016 days.

This patent is subject to a terminal disclaimer.

(21) Appl. No.: 14/474,561

(22) Filed: Sep. 2, 2014

(65) Prior Publication Data

US 2014/0366864 A1    Dec. 18, 2014

Related U.S. Application Data

(63) Continuation-in-part of application No. 12/658,412, filed on Feb. 10, 2010, now Pat. No. 9,138,098.

(51) Int. Cl.

| | |
|---|---|
| *F24C 3/08* | (2006.01) |
| *F24C 15/10* | (2006.01) |
| *F24C 3/00* | (2006.01) |
| *F24C 15/14* | (2006.01) |
| *F24C 15/28* | (2006.01) |

(52) U.S. Cl.
CPC ............ *F24C 15/107* (2013.01); *F24C 3/008* (2013.01); *F24C 15/14* (2013.01); *F24C 15/28* (2013.01); *Y02B 40/166* (2013.01)

(58) Field of Classification Search
CPC ........ F24C 3/008; F24C 15/107; F24C 15/28; F24C 15/14; Y02B 40/166

USPC ....... 126/43–49, 241 D, 1 R, 9 B, 9 R, 39 B, 126/39 E, 39 K, 39 M, 39 R, 40, 152 B, 126/153, 211, 215, 216

See application file for complete search history.

(56) References Cited

U.S. PATENT DOCUMENTS

| | | | | |
|---|---|---|---|---|
| 1,056,796 A | * | 3/1913 | Jordan | F24C 15/12 |
| | | | | 126/214 R |
| 1,072,115 A | * | 9/1913 | Mulay | F24C 3/085 |
| | | | | 126/214 C |
| 1,156,087 A | | 12/1915 | Kupfer | |
| 2,166,442 A | | 7/1939 | Kahn | |
| 2,856,503 A | * | 10/1958 | More | F24C 15/102 |
| | | | | 126/215 |
| 3,187,742 A | | 6/1965 | Power | |

(Continued)

*Primary Examiner* — Avinash Savani
*Assistant Examiner* — Rabeeul Zuberi

(57) ABSTRACT

The removable apparatus includes an outer wall and improved inner hollow shell which are both positioned on the cooktop of a gas stove to surround an upper section of a burner, where the outer wall surrounds the hollow shell. The improved inner hollow shell is a closed preferably circular hollow member having a larger section connected to a smaller section thereby forming a valley of space to retain dripping liquid substance in cooking. A plurality of openings penetrate through the larger section, wherein more openings are located to its low part. The outer wall has multiple openings which evenly penetrate therethrough. Many extensions projecting upwardly are spaced apart onto a top edge of the outer wall to support a cooking utensil. The apparatus is served as a flame heat transfer regulator for achieving high heating efficiency in cooking and a liquid substance retainer for easily maintaining the cooktop clean.

20 Claims, 9 Drawing Sheets

(56) References Cited

U.S. PATENT DOCUMENTS

| | | | | |
|---|---|---|---|---|
| 4,458,661 A | * | 7/1984 | Mulay | F24C 15/14 |
| | | | | 126/39 M |
| 4,794,906 A | * | 1/1989 | Longley, Jr. | F24C 1/16 |
| | | | | 126/38 |
| 5,323,759 A | | 6/1994 | Hammel et al. | |
| 5,643,481 A | * | 7/1997 | Brotzki | F24C 15/102 |
| | | | | 126/51 |
| 5,931,152 A | * | 8/1999 | Fafet | C03B 11/07 |
| | | | | 126/214 A |
| 6,447,906 B1 | * | 9/2002 | Andrejcak | C04B 20/1059 |
| | | | | 264/86 |
| 6,505,621 B2 | | 1/2003 | Gabelmann | |
| 8,851,419 B2 | | 10/2014 | Cottet | |
| 2004/0045542 A1 | | 3/2004 | Zhou | |
| 2005/0109330 A1 | | 5/2005 | Pestrue et al. | |
| 2005/0115556 A1 | | 6/2005 | Carson et al. | |
| 2006/0065264 A1 | * | 3/2006 | Huggins | F24C 5/20 |
| | | | | 126/43 |

\* cited by examiner

US 10,203,118 B2

REMOVABLE APPARATUS TO REGULATE FLAME HEAT TRANSFER AND RETAIN DRIPPING LIQUID SUBSTANCE FOR A GAS STOVE BURNER

CROSS-REFERENCE TO RELATED APPLICATIONS

This application is continuation-in-part of U.S. patent application Ser. No. 12/658,412 filed on Feb. 10, 2010 which is the divisional application of U.S. Pat. No. 7,708,006 issued on May 4, 2010.

BACKGROUND OF THE INVENTION

1. Field of the Invention

The present invention is related to an accessory of a gas stove which is used for increasing heating efficiency of the flame and retaining dripping liquid substance in cooking.

2. Description of the Prior Art

Gas stoves including the cooktops are known. The following 9 United States patents and published patent applications are the closest prior art references related to the present invention.

U.S. Pat. No. 1,156,087 issued to Kupfer on Oct. 12, 1915 for "Flame Shield For Gas Stove" discloses a cylindrical metal tube which is used as a flame shield for a burner of the gas stove. The tube is comprised of a circular wall having an upper end and a lower end, wherein a plurality of vertical slots, preferably three, are circumferentially spaced on the wall. The slots are extending upward from the lower end of the wall to an upper position of the wall, wherein one of them is arranged to fit over the gas pipe. The flame shield is positioned between the stove grids on the cooktop and a platform placed under the cooktop, wherein the upper end of the shield reaches into the plane of the undersurface of the grids, the lower end of the shield rests upon the platform, and the body portion of the shield surrounds the burner.

U.S. Pat. No. 2,166,442 issued to Kahn on Jul. 18, 1939 for "Cooking Stove" discloses a mechanical structure which is connected to the top of a gas burner having a plurality of gas ports and the cooktop of a stove, wherein an annular curved shield surrounds the burner adjacent the gas ports and extends upwardly and outwardly to the inside edge of the recessed shoulder of the cooktop for directing the heat from the burner toward the grate opening.

U.S. Pat. No. 3,187,742 issued to Power on Jun. 8, 1965 for "Combination Gas Burner Grid And Flame Shield" discloses an improved gas burner grid comprising a substantially rigid and arcuate shield to eliminate any undesirable overheating of a pan handle. The shield is placed to the radial innermost ends of the two adjacent ribs, which are among a total of 8 ribs, wherein all the ribs are circumferentially spaced onto a rigid, cast-iron ring of the circular grid. The grid is further adapted to be seated removably in the upper open end of a stationary, generally cup shaped housing having a bottom through the center of which projects a conventional gas stove burner.

U.S. Pat. No. 6,851,419 issued to Reiner on Feb. 8, 2005 for "Portable Hiking Stove" discloses an improved portable hiking stove. The stove is comprised of a base member having a plurality of air passages therethrough with an opening dimensioned to receive a burner therein, three identical side members vertically dimensioned so as to be assembled together to support the horizontal base member therebetween, and a circularly cylindrical wall acted as a wind screen having a lower bottom end from which is supported by three protrusions of the respective three side members. Each identical side member is further comprised of a plurality of air passages placed on its lower part, wherein the positions of the air passages therethrough each side member are lower than the position where the base member is supported therebetween the side members. The wind screen is further placed, wherein its upper end is positioned to be higher than the upper ends of the side members, and its lower end is positioned to be higher than the horizontal base member which is placed.

United States Patent Publication No.: 2005/0115556 issued to Carson et al. on Jun. 2, 2005 for "Turkey Fryer/Outdoor Cooker Wind and Fire Guard" discloses a wind screen device for outdoor grill. The device can be assembled from a horizontal bottom plate and a series of vertical side plates to be a cuboid enclosure or wind screen. The enclosure is capable of hosting a variety of types and sizes of outdoor cooking units. The windscreen device includes at least one pair of air vent openings therethrough adjacent to a bottom edge of each side plate, and an additional opening in one of its side plates, which is designed to admit a gas hose therethrough.

United States Patent Publication No. 2004/0045542 issued to Zhou et al. on Mar. 11, 2004 is for an "Outdoor Cook Stove". The Publication discloses a portable outdoor stove including a burner and a wind guard having an opened bottom end of cylinder shape capable of tightly coupled with a cooking vessel and possessing window opening of less than 180 degree toward its top for exhaust outlet, wherein the burner is placed at the center of the opened bottom of the wind guard.

United States Patent Publication No.: 2005/0109330 issued to Pestrue et al. on May 26, 2005 for "Cooking Stove Including Invertible Support Rack, Support Rack With Dual Cooking Surfaces And Method Of Using Same" discloses a stove for outdoor use. The stove includes a hollow shell, supporting structure, and a burner assembly, operatively attached to the side of the shell, and a vessel support rack for placement on the shell.

The modern gas stoves for the household usage can be classified to a sealed burner mounting and an opened burner mounting (see commercial stoves elsewhere), regarding the mechanical structure to affix gas burners onto the cooktops of the stoves. The former one is also illustrated from U.S. Pat. No. 5,323,759 issued to Hammel et al. on Jun. 28, 1994 for "Sealed Burner Mounting Assembly" (the Hammel Patent) and U.S. Pat. No. 6,505,621 issued to Gabelmann on Jan. 14, 2003 for "Sealed Gas Burner Assembly" (the Gabelmann Patent) (see FIGS. 1 and 2, and illustration in the section of Description of this Application).

From the illustration of the above mentioned Hammel and Gabelmann Patents, it has been discovered that there is absence of a flame heat transfer regulating apparatus for a burner of the gas stove cooktop. For overcoming this deficiency, U.S. Pat. No. 7,708,006 issued to Sun on May 10, 2010 discloses the apparatus that includes an inner hollow shell and outer wall. The flame heat transfer regulating apparatus is removably placed onto the stove cooktop to surround an upper section of a gas burner and support a cooking utensil. Therefore, the radiated and convected heat from flame of the gas burner are well regulated, which are maximally directed to heat the utensil, so that the utensil is effectively and efficiently heated. With the aid of the apparatus, increase of the heating efficiency in cooking can be significantly achieved for the existing gas stoves, to thereby bring advantages of reduction of the combustible gas consumption which is good for the cost reduction, and reduction of the greenhouse gas production which is beneficial to the environmental protection.

However, a deficiency has also been discovered from application of the apparatus that if it drips from the utensil in cooking, a dripping liquid substance including liquid or liquid mixture would drip along an inner surface of the inner hollow shell to areas of the stove cooktop adjacent the burner and side of the burner having a high temperature. In such situation, the liquid substance could be burned to thereby dirt the stove cooktop and burner. Since the burned substance is difficult to clean which brings inconvenience to the stove users, it is necessary to overcome this deficiency thereby satisfying a user-friendly advantage of the consumer products.

Gas stoves are of popularly used home appliances in human society which demands the appliances to possess the user-friendly character for the customer satisfaction. Usage of the gas stoves consumes tremendous amount of the combustible gases, and also generates significant amount of carbon dioxide gases which are of total greenhouse gases generated by human society. Therefore there is a significant need to provide removable apparatus for a gas stove burner to regulate the flame heat transfer and retain the dripping liquid substance, thereby significantly improving the user-friendly advantage of the stove, and increasing the flame heating efficiency in cooking which brings advantages of reduction of the combustive gas consumption and greenhouse gas production for the cost reduction and environment protection.

SUMMARY OF THE INVENTION

The present invention is a removable apparatus for a gas stove burner to regulate the flame heat transfer and retain dripping liquid substance in cooking. The apparatus is comprised of an improved inner hollow shell and outer wall in a symmetrical preferably circular shape.

The improved inner hollow shell is a closed hollow member. In the preferred embodiment, it is a circular hollow member which has a circular outer section including a body and a circular outer edge to surround a larger opening, and a circular inner section having a circular inner edge to surround a smaller opening. The outer section from the outer edge extends downwardly and inwardly to connect to the inner section which from the inner edge extends downwardly and outwardly to connect to the outer section thereby forming a bottom circumference and a circular valley of space of the hollow member, wherein the valley is served as a retainer to retain the dripping liquid substance including liquid and liquid mixture in cooking. In addition the outer edge is larger than and positioned higher than the inner edge.

The outer section also has a plurality of identical openings serving as air passages that penetrate through upper and lower parts of its body, wherein the openings are greater in quantity and are more densely located in the lower part, as compared with the openings which are fewer in quantity and are less densely located in the upper part of the body.

In the square shape, the outer wall is comprised of four identical upward plates, which are connected to one another to form the wall. A plurality of openings serving as the air passages are evenly located to each plate. In addition, an extension projecting upwardly to have a top end is positioned at a middle of a top edge of each plate. A plurality of attachment means are placed onto an inner side of each plate, which are used to affix optional utensil supports so that a small cooking utensil can be placed on the optional utensil supports for cooking.

Both the inner hollow shell and outer square wall are positioned onto a cooktop of the gas stove, wherein the improved inner hollow shell is further positioned to surround an upper section of a gas burner. The outer square wall is positioned to surround the inner hollow shell and additionally support a cooking utensil, wherein the utensil is placed on the top ends of the extensions. The extension is further served as a flame shield to prevent undesirable heating a handle of the utensil in cooking.

Application of the removable apparatus can increase the flame heating efficiency in addition to catch the dripping liquid substance in cooking. Regarding an advantage of increased heating efficiency, the improved inner hollow shell contributes to the advantage through regulating the heat transfer including the heat radiation and heat convection of the flame.

In regulating the flame heat radiation, its outer section reflects radiated heat of the flame, which is initially radiated outwardly and downwardly away from the flame thus the utensil, back to heat the utensil. In regulating the flame heat convection including air convection, its outer section directs the heat and air to flow to the utensil. Air with a lower temperature from the surrounding areas of the flame is regulated to flow to the burner for involving in combustion, wherein the air mainly flows through the openings more densely located to the lower part of the outer section. Air and exhaust gases with a higher temperature of the flame are regulated to flow upwardly to heat the utensil, wherein the air and exhaust gases are both surrounded by the outer section of the inner hollow shell.

The outer square wall contributes to the increased heating efficiency through its first blocking radiated heat which is radiated outwardly from the outer side of the inner hollow shell. The outer square wall second provides the air passages which regulate the air with the lower temperature from surrounding areas of the flame to flow towards the inner hollow shell. The outer square wall third provides a gap which is constructed by the extensions for the exhaust gases and air with the higher temperature to flow outwardly and upwardly to heat the utensil. In addition, the outer square wall is served as a heat shield to prevent undesired heating a handle of the utensil in cooking.

It is therefore an object of the present invention to provide a removable apparatus for a gas burner of a stove, wherein the apparatus is comprised of an improved inner hollow shell and outer wall. Application of the apparatus can increase the flame heating efficiency in cooking to thereby bring the additional advantages of reduction of the combustive gas consumption and greenhouse gas production, and retain a dripping liquid substance including liquid or liquid mixture dripped in cooking to thereby bring the user-friendly advantage of easily maintaining the stove cooktop clean.

It is also an object of the present invention to provide the improved inner hollow shell which is a closed hollow member. In a preferred circular shape, the member has a circular outer section including a body and a circular outer edge to surround a larger opening, and a circular inner section having a circular inner edge to surround a smaller opening. The outer section from the outer edge extends downwardly and inwardly to connect to the inner section which from the inner edge extends downwardly and outwardly to connect to the outer section thereby forming a bottom circumference and a circular valley of space of the hollow member, wherein the valley is served as a retainer to retain the dripping liquid substance in cooking. Therefore the improved inner hollow shell contributes to the increased heating efficiency from regulating the heat radiation of the flame, wherein the outer section reflects the radiated heat of the flame that is initially radiated outwardly and downwardly away from flame thus the utensil back to heat the utensil.

It is an additional object of the present invention to provide the improved inner hollow shell, which is comprised of a plurality of openings serving as the air passages penetrating through upper and lower parts of the body of the outer section, wherein the openings are greater in quantity and are more densely located to the lower part, as compared with the openings which are fewer in quantity and are less densely located to the upper part of the body, so that the improved inner hollow shell contributes to the increased heating efficiency from regulating the heat convection including air convection. Air with a lower temperature from the surrounding areas of the flame is regulated to flow to the flame, wherein the air mainly flows through the openings of the lower part of the body to involve in combustion. In addition, air and exhaust gases with a higher temperature are regulated to flow upwardly through the larger opening to heat the utensil, wherein the air and exhaust gases are both surrounded by the outer section of the improved inner hollow shell.

It is a further object of the present invention to provide the improved inner hollow shell having the circular valley of space, wherein the valley is served as a retainer for holding the liquid substance in case which happens in cooking to thereby bring the user-friendly advantage for easily maintaining the stove cooktop clean.

It is a further additional object of the present invention to provide the outer square wall having four identical upward plates which are connected to one another, wherein a plurality of openings serving as air passages are evenly penetrate therethrough, and an extension projecting upwardly is positioned at a middle of a top transverse edge of each upward plate, so that the outer square wall contributes to the increased heating efficiency from blocking the outwardly radiated heat which is radiated from an outer side of the outer section of the inner hollow shell, providing air passages which regulate air with the lower temperature from the surrounding areas of the flame to flow towards the improved inner hollow shell, and providing a gap which is constructed by the extensions for the flame exhaust gases and air with the higher temperature to flow outwardly and upwardly to heat the utensil.

It is an additional object of the present invention to provide the outer square wall having four identical upward plates which are connected to one another, wherein each plate has an extension projecting upwardly to form a top end which is positioned at a middle of the top edge of each plate, so that each extension of the outer square wall supports a cooking utensil which is positioned at the top end of each extension, and blocks an outward heat flow thereby serving as a flame heat shield to prevent undesirable heating a handle of the utensil in cooking.

It is a further additional object of the present invention to provide ceramics as appropriate materials for manufacturing the apparatus, which enhances the apparatus to regulate the flame heat transfer.

It is also an object of the present invention to provide the removable apparatus which is removably placed on the cooktop of the gas stove, so that the apparatus is easily to be maintained including easily cleaned.

It is a further object of the present invention to provide a removable apparatus containing an integrated improved inner hollow shell and outer wall, so that the apparatus brings an additional advantage of versatility in use.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Disclosure of the present invention includes two sections. The first section is consistent with disclosure of U.S. Pat. No. 7,708,006, specifically for illustrating inner hollow shell and outer wall of the apparatus having the single function to regulate the flame heat transfer. The second section is related to an improved inner hollow shell incorporated with the outer wall to thereby form the present invention removable apparatus having dual function to regulate the flame heat transfer and retain dripping liquid substance.

(I) The Removable Flame Heat Transfer Regulating Apparatus

Figure 1:
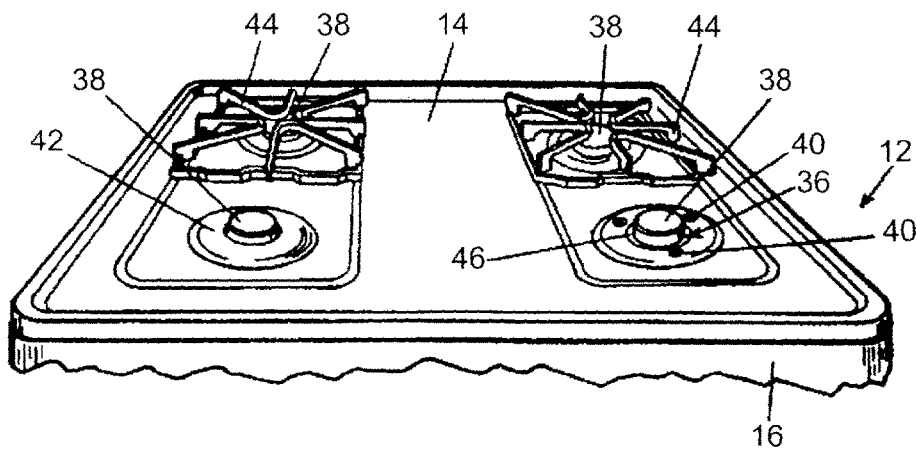
FIG. 1 is a front perspective view of a prior art cooktop including individual grates from a gas stove having a sealed burner mounting assembly, where the figure illustrates absence of a flame heat transfer regulating apparatus that could be placed on the cooktop to surround a burner and support a cooking utensil.
Figure 2:
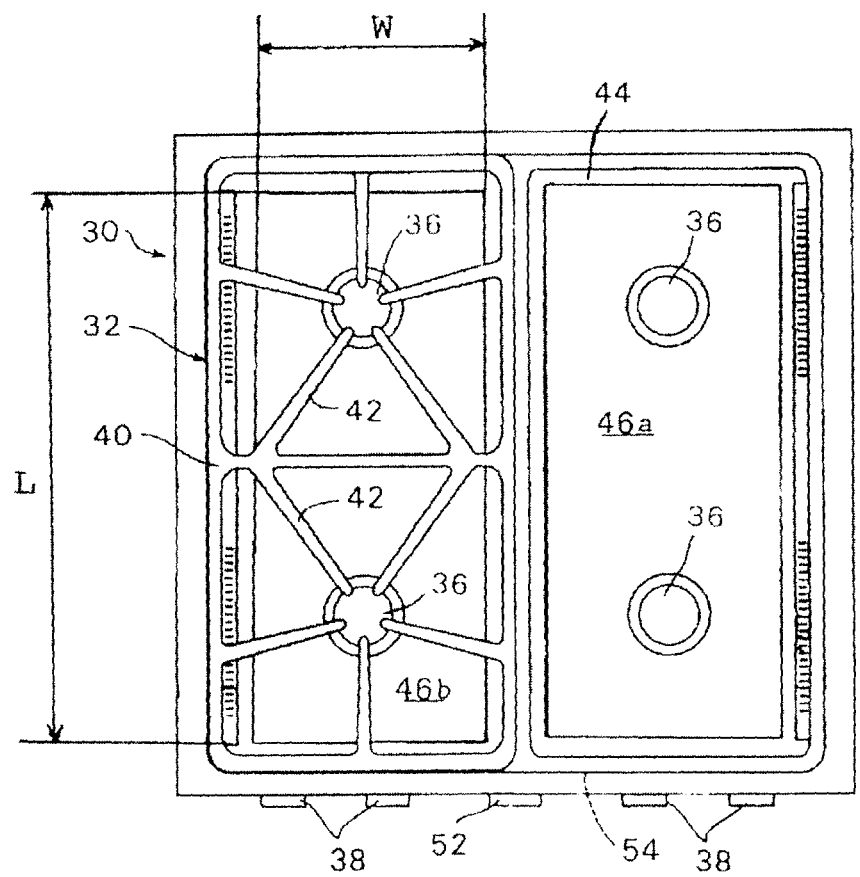
FIG. 2 is a top plan view of another prior art cooktop including an extended grate from a gas stove having a sealed gas burner assembly, where the figure illustrates absence of a flame heat transfer regulating apparatus that could be placed on the cooktop to surround a burner and support a cooking utensil.

Reference to the present FIGS. 1 and 2 illustrates well known cooktops of the modern gas stoves as the prior art. Referring to FIG. 1, there is illustrated main cooktop 14 of a gas stove having a sealed burner mounting assembly and two individual grates 44 which are positioned to cover the respective two of four burners 38 on the cooktop 14. The present FIG. 1 is a copy of FIG. 1 of U.S. Pat. No. 5,323,759 to Hammel et al. for "Sealed Burner Mounting Assembly", from which all of the reference numbers are copied.

Referring to FIG. 2, there is illustrated a top plan view of a cooktop having an extended grate. The present FIG. 2 is a copy of FIG. 2 of U.S. Pat. No. 6,505,621 to Gabelmann for "Sealed Gas Burner Assembly". Reference to FIG. 2 illustrates that an extended removable grate 40 is provided on the cooktop 32 to extend from the front to the back with a plurality of fingers 42 for supporting cook pans or the like utensils above a front gas burner 36 and a back gas burner 36.

From illustration in FIGS. 1 and 2 of the prior art cooktops of the gas stoves, it has been discovered that there is absence of a removable flame heat transfer regulating apparatus. The apparatus can be removably positioned onto the stove cooktop to surround an upper section of a gas burner or the burner for increasing the heating efficiency of a flame of the gas burner, supporting a cooking utensil, and preventing undesirable heating a handle of the utensil in cooking. It would be appreciated that heat transfer from the flame of the burner to the utensil is dependent upon factors including heat radiation and heat convection of the flame. Therefore with the aid of the removable flame heat transfer regulating apparatus, heat radiation and convection of the flame can be well regulated so that the utensil can be effectively and efficiently heated, and the present invention can reach the object to significantly increase the heating efficiency of the flame in cooking.

Figure 3:
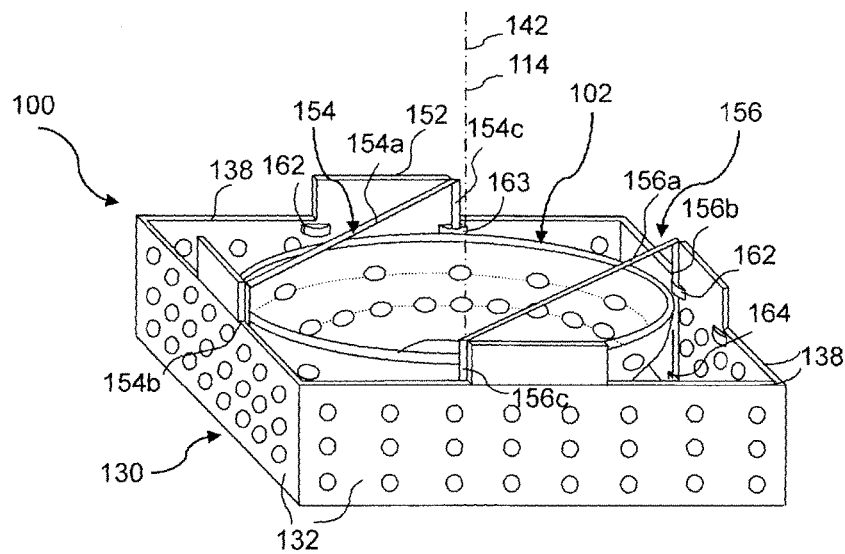
FIG. 3 is a perspective view of a removable flame heat transfer regulating apparatus having an inner circularly arcuate hollow shell, outer square wall and optional utensil supports according to a first embodiment of the present invention.
Figure 4:
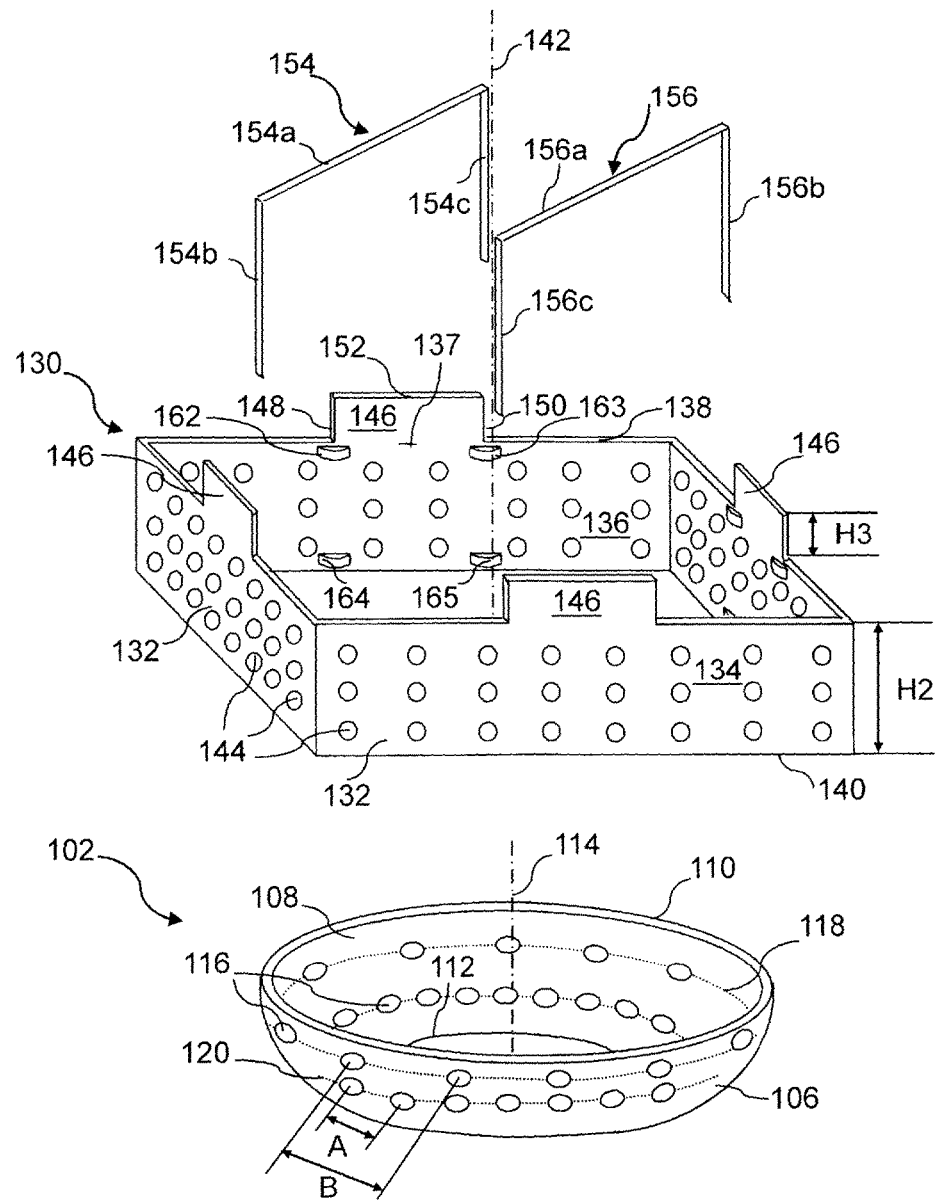
FIG. 4 is a perspective exploded view to illustrate the inner circularly arcuate hollow shell, outer square wall and optional utensil supports according to the first embodiment of the present invention removable flame heat transfer regulating apparatus.
Figure 5:
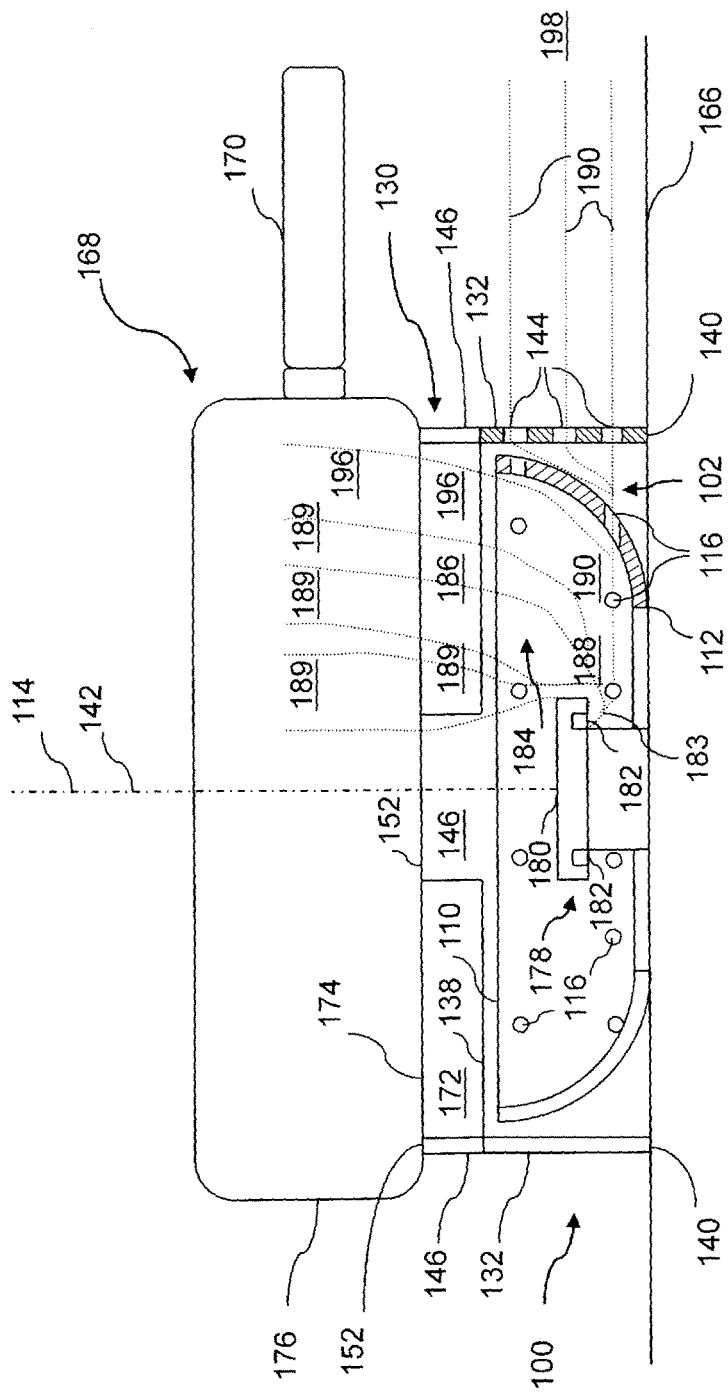
FIG. 5 is a schematic view of a burner region of a stove cooktop including a cross-section view of the right half of the first embodiment to illustrate application of the first embodiment of the present invention wherein the inner hollow shell is positioned on the cooktop of the stove to surround an upper section of the gas burner, and the outer square wall is positioned on the cooktop to surround the inner hollow shell and further support a cooking utensil. For a better presentation, FIG. 5 only shows a right side of the flame, the air flow and exhaust gas flow, which are represented by evenly spaced dotted lines.

Referring to FIGS. 3, 4 and 5, there is illustrated removable flame heat transfer regulating apparatus 100 from a first embodiment of the present invention. The apparatus 100 is comprised of an inner circularly arcuate hollow shell 102 and an outer square wall 130, which are both placed onto a stove cooktop 166. The inner hollow shell 102 is positioned to surround an upper section 178 of a gas burner. The outer square wall 130 is positioned to surround the inner hollow shell 102 and support a cooking utensil 168 having a bottom surface 174, wherein the utensil 168 is placed above the burner.

As illustrated in FIG. 4, the inner hollow shell 102 is a circularly ascending arcuate wall comprising an outer surface 106, an inner surface 108, a top opening with a top circumference or edge 110 and a bottom opening with a bottom circumference or edge 112, wherein the outer and inner surfaces are identical. The inner hollow shell 102 from its bottom circumference 112 extends upwardly and outwardly to end the top circumference 110. Therefore, the top circumference 110 is larger than the bottom circumference 112, wherein both circumferences are relative to a rotational axis 114 of the inner hollow shell 102. As additionally illustrated, the inner circularly arcuate hollow shell 102 is configured to be concave if viewing it along a direction from the rotational axis 114 to the inner surface 108. In a preferred embodiment the inner hollow shell 102 is circularly parabolic in shape.

It would be appreciated that, the concave including the parabolic shape of the inner circularly arcuate hollow shell 102 is designed from the spirit and scope of the present invention for regulating the flame heat radiation, and the flame heat convection including the air convection.

The concave including the parabolic shaped inner hollow shell 102 can reflect the outwardly and downwardly radiated heat, which is initially radiated by the flame away from the flame thus the utensil, back to heat the utensil bottom surface 174. In above illustration, the outward and downward directions of the radiated heat from the flame are defined relative to the horizontal orientation of the bottom surface 174 of the utensil 168 which is positioned above the burner. It would be appreciated that heat radiation from the flame is towards every angular directions in the three-dimensional space. Therefore, the flame which is positioned under the bottom of the utensil has a portion of the radiated heat, which is outward and downward away from the flame thus the utensil. This means that the portion of the radiated heat is not used to heat the utensil. In the presence of the present invention inner hollow shell 102, the heat radiated outwardly and downwardly from the flame can be regulated to be reflected back for heating the utensil 168. This is one of reasons for the present invention to achieve a higher heating efficiency in cooking, as compared with a lower heating efficiency of the prior art cooktops of the gas stoves without having the inner hollow shells.

The inner hollow shell 102 is further illustrated in FIG. 4 to comprise a plurality of openings 116 served as air passages therethrough, wherein the openings 116 are divided into a first and second group. The openings 116 in the first group are circumferentially spaced apart to align with an upper circumference 118 of the inner hollow shell 102 which is adjacent to the top circumference 110. The openings 116 in the second group are also circumferentially spaced apart to align with a lower circumference 120 adjacent to the bottom circumference 112. However, the openings 116 are not evenly located to the two groups.

Such uneven location of the air passages is illustrated in FIG. 4 from a distance "A" between two adjacent air passages 116 aligning with the lower circumference 120 and a distance "B" between two adjacent air passages 116 aligning with the upper circumference 118, wherein the distance "A" is shorter than the distance "B". Therefore, the air passages 116 are greater in quantity and are more densely located to a lower part of the inner hollow shell 102 having the bottom circumference 112, as compared with the air passages 116 which are fewer in quantity and are less densely located to an upper part of the inner hollow shell 102 having the top circumference 108.

It would be appreciated that from the above illustrated embodiment serving as an example, the present invention discloses a general structure of the unevenly located air passages for the inner hollow shell. Such structure is particularly designed to regulate the heat convection of the flame in cooking, wherein the heat convection is based on the air convection which is taken place in space including surrounding areas of the flame and areas occupied by the flame.

The air with a lower temperature has a heavier density, which occupies a lower part of the space adjacent the flame. In contrast, the air with a higher temperature which has a lighter density occupies an upper part of the space including the area where the flame is located. Such density difference causes a natural air convection pattern of the flame. A colder air having the lower temperature, which is initially positioned in the surrounding areas of the flame, flows to the burner for involving in the flame combustion through a path which occupies a lower part of the space. A hotter air having the higher temperature which is positioned in the upper part of the space flows upwardly away from the flame. Therefore, the densely located air passages 116 on the lower part of the inner hollow shell 102 will provide a less flow resistance for the air with the lower temperature to flow towards the upper section 178 of the burner, wherein the air having oxygen is necessary for combustion of the combustive gaseous mixture to form the flame.

Referring again to FIG. 4, there is illustrated outer square wall 130 comprising four identical upward plates 132. Each plate has a height "H2" of a top edge 138, an exterior side 134 and an interior side 136. The upward plates 132 are connected to one another to form the outer square wall 130 having a top square transverse edge 138, a bottom square transverse edge 140, and a central symmetric axis 142. As further illustrated, a plurality of air passages 144 of openings are evenly to penetrate through each plate 132. It would be appreciated that from the spirit and scope of the present invention that include to regulate the air convection, a number of the air passages 144 therethrough the outer square wall 130 are more than a number of the air passages 116 of the inner hollow shell 102. The result is that a combined area of the openings on the outer square wall 130 is larger than a combined area of the openings on the inner hollow shell 102.

Referring additionally to FIG. 4, each upward plate 132 at the middle position of the top transverse edge 138 is comprised of an extension 146 projecting upwardly. The upward extension 146 is comprised of a transverse top end 152, a first and second upward side 148 and 150 having an identical height "H3". As illustrated, the height "H3" of each of the upward sides 148 and 150 is shorter than the height "H2" of each of the upward plates 132. In addition, the length of the top end 152 is generally longer than that of the respective upward sides 148 and 150, so that the extension 146 can be served as a heat shield.

Figure 4A:
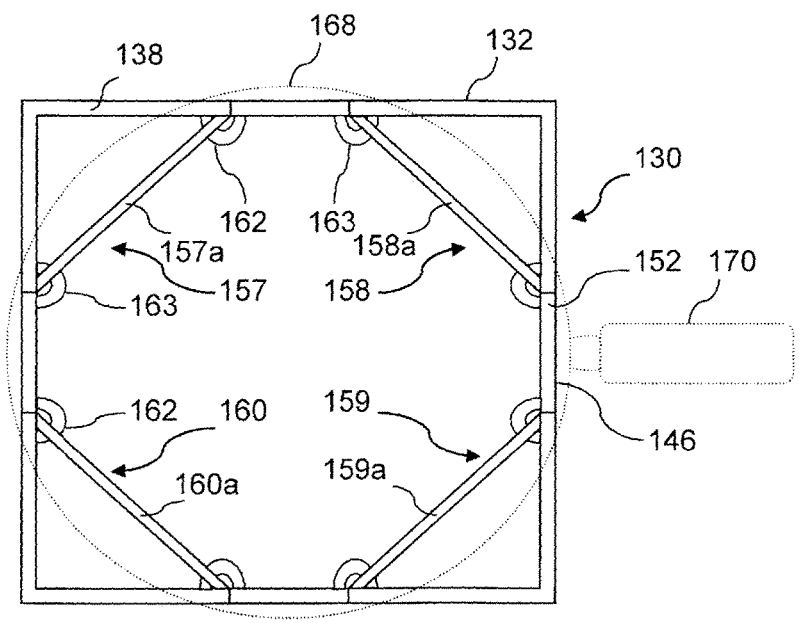
FIG. 4A is a top plan view of another preferred optional utensil supports of the outer square wall from the first embodiment of the present invention removable flame heat transfer regulating apparatus.

It would be appreciated that the extension 146 as the heat shield can block an outward heat flow of the flame which is towards the extension 146. The outward heat flow could turn into an upward heat flow if there is absence of the extension 146, so that the upward heat flow can heat an object, which is positioned above the flame and further vertically aligned with the upward heat flow. Therefore as illustrated in FIGS. 4A and 5, the upward extension 146 can prevent undesirable heating a handle 170 of the utensil 168 in cooking, where the utensil is placed on the top ends 152 of the extensions 146 of the outer square wall 130, and the handle 170 is positioned to vertically align with the center of the extension top end 152. In addition as illustrated in FIG. 5, the extensions 146 from the present invention are designed to further support the utensil 168 having the flat bottom surface 174 such as a pan, or having a convex shaped bottom side such as a wok.

Referring further to FIG. 4, there is illustration that a first group of an upper hook 162 and a lower hook 164 or attachment means are positioned on the interior side 136 of each identical plate 132 of the outer square wall 130, wherein two hooks 162 and 164 are aligned with the first upward side 148 of the identical extension 146. In addition, the upper hook 162 is positioned adjacent to the top transverse edge 138 and the lower hook 164 is positioned adjacent to the bottom transverse edge 140 of the outer square wall 130. Similarly, a second group of an upper hook 163 and a lower hook 165 or attachment means are positioned on the interior side 136 of each identical plate 132, which are aligned with the second upward side 150 of the extension 146. As illustrated, the upper hook 163 is positioned adjacent to the top edge 138 and the lower hook 165 is positioned adjacent to the bottom edge 140 of the outer square wall 130.

It would be appreciated that the hooks are designed to affix first and second identical optional utensil supports 154 and 156 onto the outer square wall 130, so that a small utensil can be placed on the optional supports 154 and 156. The first optional utensil support 154 is illustrated in FIG. 4 to be in a generally inverted "U" shape, comprising a top transverse section 154a, and identical first and second downward sections 154b and 154c. The optional utensil supports can be made with flat metal strips or round metal rods.

Referring to FIGS. 3 and 4, when in use of the optional support 154, the first downward section 154b is inserted into the first group of the upper and lower hooks 162 and 164 of the first identical plate 132, and the second downward section 154c is inserted into the second group of the upper and lower hooks 163 and 165 of the second identical plate 132, wherein the top transverse section 154a is positioned to align with the top ends 152 of the respective extensions which are positioned. As illustrated, the second identical plate 132 is adjacent the first identical plate 132 in the clockwise direction relative to the symmetric axis 142, and the first and second identical plates 132 are connected at a 90-degree angle. In this setting, the top transverse section 154a of the first optional utensil support 154 and projections of the respective top edges 138 of the respective first and second identical plates 132 adjacent each other form an isosceles right angled triangle, wherein the top transverse section 154a is the hypotenuse side.

Similarly, the second optional utensil support 156 can be affixed. This results in that it is in parallel for, and has a short distance between the top transverse sections 154a and 156a of the respective first and second optional utensil supports 154 and 156. As illustrated in FIG. 3, the distance is shorter, as compared with a longer distance between two oppositely positioned upward plates 132 of the outer square wall 130. Therefore, a small pan can be conveniently placed onto the two transverse top sections 154a and 156a of the respective first and second optional supports 154 and 156.

Figure 4B:
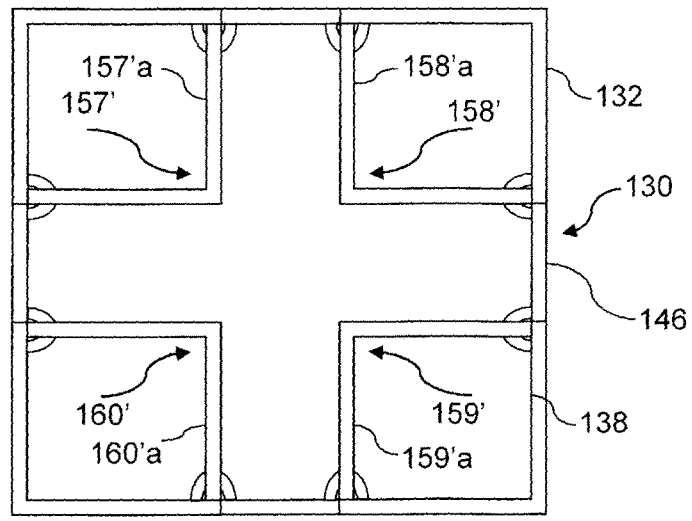
FIG. 4B is a top plan view of additional preferred optional utensil supports of the outer square wall from the first embodiment of the present invention removable flame heat transfer regulating apparatus.

It would be appreciated that with the presence of the first group of the upper and lower hooks 162 and 164 or attachment means, and second group of the upper and lower hooks 163 and 165 or attachment means on each upward plate 132, various variations of the optional utensil supports can be formed, which are illustrated in FIGS. 4A and 4B.

Referring to FIG. 4A, there is illustrated another preferred configuration of the optional utensil supports of the outer square wall 130, comprising four identical, generally inverted "U" shaped optional supports 157, 158, 159 and 160. Each identical optional utensil support 157 is comprised of a top transverse section 157a, and identical first and second downward sections (both not shown). When in use of the first optional utensil support 157, the first downward section is inserted into the second group of the upper hook 163 and lower hook (not shown) of the first identical plate 132, and the second downward section is inserted into the first group of the upper hook 162 and lower hook (not shown) of the second identical plate 132. In this setting, if viewing the top plain view of FIG. 4A, the top transverse section 157a of the first optional utensil support 157 and the top edges 138 of the respective first and second identical plates 132 adjacent each other form an isosceles right angled triangle at the north-west corner of the outer square wall 130, wherein the top section 157a is the hypotenuse side of the isosceles right angled triangle.

Following the similar procedure, the top transverse section 158a of the second optional utensil support 158 is the hypotenuse side of the isosceles right angled triangle at the north-east corner of the outer square wall 130. Similarly, the top transverse section 159a of the third optional utensil support 159 is at the south-east corner, and the top transverse section 160a of the fourth optional utensil support 160 is at the south-west corner. Therefore the top sections 157a, 158a, 159a and 160a form a square structure to support a small cookware, wherein the structure is positioned to align with the top ends 152 of the respective extensions which are positioned.

Referring to FIG. 4B, there is illustrated additional preferred configuration of the optional utensil supports of the outer square wall 130, comprising four identical, generally inverted "U" shaped optional supports 157', 158', 159' and 160'. The configuration of the optional utensil supports illustrated in FIG. 4B is identical to the configuration in FIG. 4A, except for the top transverse section 157'a of the identical optional utensil support 157' that is a 90-degree bent structure, as compared with a straight transverse section 157a of the identical optional utensil support 157. Therefore, the top sections 157'a, 158'a, 159'a and 160'a form a generally hollow cross shaped structure to support the small utensil.

It would be appreciated that, although the above illustration including FIGS. 4, 4A and 4B discloses various variations of the optional utensil supports including the attachment means on each upward plate 132, the optional utensil supports including the attachment means are not limited in accordance with the spirit and scope of the present invention. In fact, any optional utensil supports are appropriate if they are detachable, and are able to be affixed onto the outer square wall 130 by the attachment means for supporting the utensil. In addition, the attachment means are able to be placed on both interior and exterior sides of the outer square wall for affixing the optional utensil supports. Furthermore, at least one attachment means is appropriate for each identical upward plate 132 according to the spirit and scope of the present invention.

Reference to FIG. 5 illustrates application of the first embodiment 100 of the present invention removable flame heat transfer regulating apparatus. The inner circularly arcuate hollow shell 102 is first positioned onto the cooktop 166 of the stove to surround the upper section 178 of the gas burner. The outer square wall 130 is second positioned onto the cooktop 166 to surround the inner hollow shell 102, wherein the rotational axis 114 of the inner hollow shell 102 is aligned with the symmetric axis 142 of the outer square wall 130. They are further aligned with a center of the top cap 180 of the burner having a plurality of gas ports 182 which are circumferentially spaced apart on a side wall of the cap. The bottom surface 174 of the cooking utensil 168 having a cylindrical outer side 176 is placed onto the top end 152 of each extension 146 of the outer square wall 130. In this setting, the top circumference 110 of the inner hollow shell 102 is positioned higher than the burner cap 180. The top square edge 138 of the outer square wall 130 is positioned including at least with the same height as the top circumference 110 of the inner hollow shell 102.

In addition, a gap 172 between the top edge 138 of the square wall 130 and the bottom surface 174 of the utensil 168 is sufficiently wide, which is provided by the extensions 146. The gap 172 permits that the hot exhaust gases from the flame and hot air flow freely, outwardly and upwardly along the outer side 176 of the utensil to thereby heat the utensil 168. It would be appreciated that in the presence of the wide gap 172 it will not generate a back pressure for the hot gases. The back pressure could force the flame to burn out of the gap 172, so that the flame positioned outside of the outer square wall 130 cannot be effectively used to heat the utensil 168. Therefore, the outer square wall 130 having a sufficient height of the extensions 146 is significant for increase of the heating efficiency in cooking.

It would be appreciated that from a theory of the flame, the top part of the flame has the highest temperature. The bottom part of the flame has the lowest temperature, where a kernel of the flame is positioned. Within the kernel of the flame, combustion of the combustive gaseous mixture is initially to take place in the presence of oxygen from the air. It would be further appreciated that according to the mechanical structure of the burner which is illustrated elsewhere, the flame kernel is connected to the outlet of a gas port of the burner head, where the pressured combustive gaseous mixture flows out. It would be additionally appreciated that, from the air convection theory which is illustrated previously, the air having the lower temperature with the heavier density flows through the path which occupies the lower part of the space from the surrounding areas of the flame to the bottom of the flame for involving in the combustion.

The first embodiment 100 of the present invention removable flame heat transfer regulating apparatus is designed to exactly follow such well known flame theory to achieve a high heating efficiency in cooking through regulating the flame heat convection, in addition to regulate the heat radiation.

Referring to FIG. 5, there is illustrated air convection pattern which is regulated by the inner hollow shell 102. The air 190 having the lowest temperature flows from the surrounding areas 198 of the gas burner to the bottom part 188 of the flame 184 for involving in the gas combustion. The air 190 first passes through the air passages 144 of the outer square wall 130, and second mainly flows through the densely located air passages 116 adjacent to the bottom circumference 112 of the inner hollow shell 102.

A portion of the air 190, which is involved in combustion with the combustive gaseous mixture 183 from the burner gas ports 182, becomes the flame 184, wherein the combustion which generates exhaust gases 189 continuously takes place to the top 186 of the flame 184. As illustrated, the top 186 of the flame 184 is under the bottom surface 174 of the cookware 168. The rest of the air 190 which is not involved in the combustion is then heated, and continuously flows up to be an air 196 with the highest temperature, which is the same temperature as that of the top flame 186. In this situation, the hottest air 196 and the top flame 186 heat the bottom surface 174 of the utensil 168. In addition, the hottest air 196 and exhaust gases 189 from the top flame 186 flow outwardly throughout the gap 172 and continuously flow upwardly along the cylindrical outer side 176 of the utensil away from the flame 184, which further heat the utensil 168 through heating its cylindrical outer side 176. Therefore, a high efficiency of heating in cooking can be achieved with such regulated heat convection, wherein the hottest air and exhaust gases flow mostly around the outer side 176 and the bottom surface 174 of the utensil 168.

It would be appreciated that in above illustrated flame heat convection, the inner circularly arcuate hollow shell 102 contributes significantly to regulate patterns of the heat convection including the air convection. First, the densely located air passages on the lower part of the inner hollow shell 102 will provide a less flow resistance for the air with the lower temperature to the upper section 178 of the burner, wherein the air having oxygen is necessary for combustion of the combustive gaseous mixture to form the flame. Second, the hot air and exhaust gases are surrounded by the inner hollow shell 102, so that they are forced to flow upwardly to heat the bottom surface 174 of the utensil 168. Then they continuously flow outwardly through the gap 172 to heat the utensil outer side 176.

Such regulation of the heat convection is extremely important for achieving the high heating efficiency in cooking from using the gas stove where there is a very limited height in space between the burner cap 180 and the bottom surface 174 of the utensil 168. In such setting, the pressured combustive gaseous mixture 183, which flows upwardly out of the gas ports 182, has a high speed and burns immediately with the oxygen in air, which generates the flame exhaust gases 189 having a high upward speed. However, the bottom surface 174 of the utensil 168 blocks the upward pathway for the hot gases including the exhaust gases 189 and air 196. In that situation, the natural heat convection pattern of the flame, which is illustrated previously, could be disturbed so that a majority of the hot gases flow outwardly, in addition to a part of the hot gases possibly downwardly flowing towards the cooktop 166 of the stove if there is absence of the inner hollow shell 102. This will result in a lower efficiency of heating the utensil 168, as contrasted with a higher heating efficiency of the present invention.

It would be further appreciated that besides the above illustrated heat convection which is regulated by the inner hollow shell 102, the sufficiently wide gap 172, which is provided by the outer square wall 130, also contributes significantly since the gap 172 provides the pathway, which promotes to achieve the regulated flame heat and air convection.

In addition to regulate the heat conviction, the first embodiment 100 of the present invention is further able to regulate the heat radiation from the flame 184, which is illustrated previously. Therefore the regulated heat radiation also contributes to the high heating efficiency in cooking.

It would be appreciated that, the heat radiation happens from an object having a higher temperature to its surrounding areas having a lower temperature. Therefore, the outer surface 106 of the heated inner hollow shell 102 also radiates heat outwardly. However, with the presence of the outer square wall 130, which is positioned to surround the inner hollow shell 102, the radiated heat from the outer surface 106 of the inner hollow shell 102 is blocked by the outer square wall 130. Therefore the outer square wall 130 is served as a thermal wall to preserve a high temperature in the region around the upper section 178 of the gas burner, wherein the region is under the utensil 168. Therefore, the outer square wall 103 additionally contributes to the high heating efficiency in cooking.

The above mechanistic illustration for the high heating efficiency in cooking can be proved by test results, which are illustrated in a section of EXAMPLES of this Application.

It would be appreciated that, as compared with the structural features of the first embodiment 100 which have been disclosed above, various variations of the structural features are readily available. For example, a rolled bead or a rim can be added to the respective top and bottom circumferences 110 and 112 of the inner hollow shell 102 to thereby enhance its mechanical strength. In addition, the inner hollow shell 102 is not limited to be in round shape. In fact, any symmetrical shape is appropriate for the inner hollow shell 102. For example, the inner hollow shell can be in a shape having multiple sides, such as a tetragonal, pentagonal and hexagonal shape. For the same reason, the outer square wall 130 also can be in any symmetrical shape, as compared with the square shape disclosed above.

Figure 7:
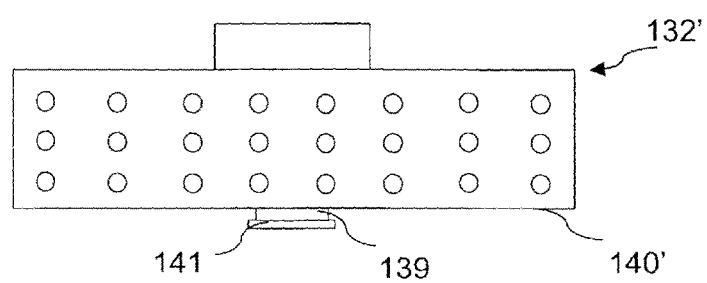
FIG. 7 is a front elevational view to illustrate a structural variation of the upward plate of the outer square wall, wherein at least one post projecting downwardly is positioned on the bottom edge of each upward plate.

Referring to FIG. 7, there is illustrated upward plate 132' having structural variations, as compared with the structure of the upward plate 132 from the first preferred embodiment 100 of the present invention. At least one post 139 projecting downwardly is placed on the bottom edge 140' of each upward plate 132'. The post 139 is used to support the upward plate 132'. Therefore, an outer square wall is also supported, wherein the outer square wall is assembled with four identical upward plates 132'. In addition, a high-temperature rubber member 141 can be placed on the bottom of each post 139 so that the smooth top surface of the cooktop 166 can be protected.

The removable flame heat transfer regulating apparatus 100 including the inner hollow shell 102 and outer square wall 130 is preferably made of durable metals and metal alloys including the sheeted iron and steel. In addition, appropriate surface treatments including coatings can be applied to the inner and outer surfaces 108 and 106 of the inner hollow shell 102, which enhance regulation of the heat convection and heat radiation as well as durability of the apparatus 100. The coatings are included those from chemical and electrochemical treatments and the ceramic coating as well, which have a preferred white or black color. Similarly, the surface treatments also can be applied to the exterior and interior sides 134 and 136 of the outer square wall 130.

Figure 6:
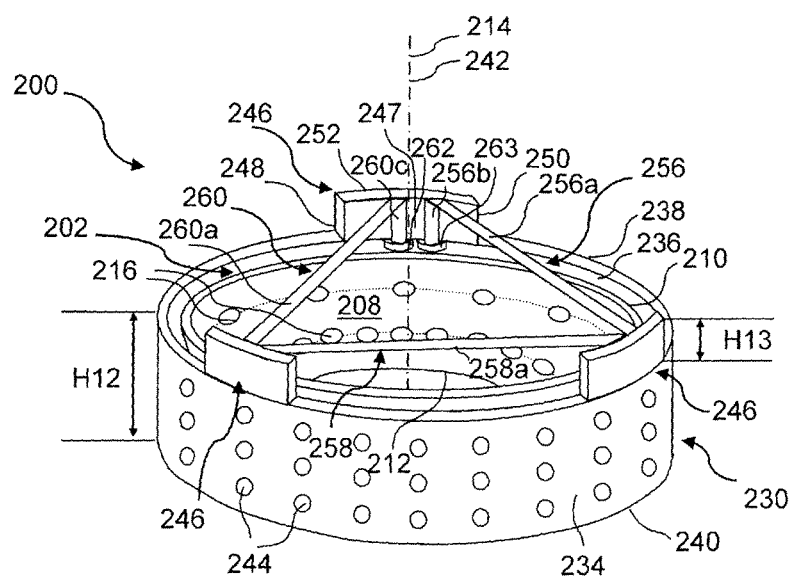
FIG. 6 is a perspective view of a removable flame heat transfer regulating apparatus according to a second embodiment of the present invention.

Referring to FIG. 6, there is illustrated second preferred embodiment 200 of the present invention removable flame heat transfer regulating apparatus for the burner of the gas stove, comprising an inner circularly arcuate hollow shell 202 and an outer circular wall 230.

It would be appreciated that the inner circularly arcuate hollow shell 202 is identical to the inner circularly arcuate hollow shell 102 of the first embodiment 100. Therefore, a disclosure of the structural features of the inner hollow shell 202 will not repeated. These structural features are designated with three-digit numerals, wherein the part numbers are the same with the addition of a "200" to the part numbers to differentiate those same features in the embodiment 100.

As illustrated, the outer circular wall 230 includes a height "H12", an exterior side 234, an interior side 236, a top circumference or edge 238, a bottom circumference or edge 240, and a rotational axis 242 which is aligned with a rotational axis 214 of the inner hollow shell 202. As further illustrated, a plurality of air passages 244 of openings are evenly to penetrate through the outer circular wall 230. It would be appreciated that from the spirit and scope of the present invention, a number of the air passages 244 of the outer circular wall 230 are more than the number of the air passages 216 of the inner hollow shell 202, which results in that a combined area of the air passages of openings of the outer circular wall 230 are more than that of the air passages of openings of the inner hollow shell 202.

The outer circular wall 230 is further comprised of at least three identical extensions 246 projecting upwardly from the top edge 238, wherein they are circumferentially spaced apart. The extension 246 is comprised of a transverse top end 252, and first and second upward sides 248 and 250 having an identical height "H13". However, the height "H13" of each of the upward sides 248 and 250 is designed to be shorter than the height "H12" of the top edge 238 of the outer circular wall 230, and the length of the top end 252 is generally longer than that of each of the upward sides 248 and 250.

It would be appreciated that the identical extensions 246 of the present invention are designed to have a triple-function. The first one is to support a utensil having a flat bottom surface such as the pan, or having a convex shaped bottom side such as the wok. The second one is to provide a gap which is the pathway for the outward and upward heat flow of the flame exhaust gases and air. The third one is to shield an undesirable heat flow for preventing it from heating a handle of the cookware. It would be additionally appreciated that at least three extensions 246 are appropriate for supporting the utensil.

Referring further to FIG. 6, there is illustration that a first group of an upper hook 262 and a lower hook (not shown) or attachment means are positioned on the interior side 236 of the outer circular wall 230. The upper hook 262 and lower hook are positioned in parallel and adjacent to a vertical linear position 247, wherein the vertical linear position is aligned with a middle position of the extension 246. In addition, the upper hook 262 is adjacent to the top edge 238 and the lower hook is adjacent to the bottom edge 240 of the outer circular wall 230. Similarly, a second group of an upper hook 263 and a lower hook (not shown) or attachment means are placed on the interior side 236 of the outer circular wall 230 in parallel and leftward adjacent to the linear position 247. The upper hook 263 is adjacent to the top edge 238 and the lower hook is adjacent to the bottom edge 240 of the outer circular wall 230.

The attachment means including hooks are designed on the outer circular wall 230 to affix three identical optional utensil supports 256, 258 and 260, so that a small cooking utensil can be placed on the optional utensil supports for cooking. The first identical optional cookware support 256 is illustrated in FIG. 6 to be in the shape of a generally inverted "U", comprising a top transverse section 256a, a first downward section 256b which is identical to a second downward section (not shown).

Referring to FIG. 6 when in use of the first optional supports 256, the first downward section 256b is inserted into the second group of the upper hook 263 and lower hook (not shown) which are leftward adjacent to the vertical linear position 247 of the first identical extension 246. The second downward section of the support 256 is inserted into the first group of the upper hook 262 and lower hook (not shown) which are rightward adjacent to the line 247 of the second identical extension 246. The second identical extension is clockwise adjacent to the first identical extension. Similarly, the second and third optional supports 258 and 260 can be affixed. Therefore, the top transverse sections 256a, 258a and 260a of the respective first, second and third identical optional supports 256, 258 and 260 form an equilateral triangle which is positioned to align with the transverse top ends 252 of the respective extensions, so that a small pan can be conveniently placed onto the top of the triangle for cooking.

It would be appreciated that, from placing the attachment means adjacent to the vertical linear position 247 of the outer circular wall 230, the smallest equilateral triangle can be achieved for supporting a corresponding utensil. In addition from the spirit and scope of the present invention, the attachment means can be placed to any positions on the outer circular wall 230, so long as the optional utensil supports can be supported by the attachment means. It would be further appreciated that with the presence of the first and second groups of the upper and lower attachment means, various variations of the optional utensil supports can be formed. One of them is similar to the configuration of the optional utensil supports illustrated in FIG. 4B, which will not be repeated again. It would be additionally appreciated that each group of the attachments is comprised of at least one attachment.

EXAMPLES

The following are examples of the present invention heat transfer regulating apparatus for the burner of the gas stove, which are offered by way of illustration only and not by way of limitation.

(1) Construction of the Removable Flame Heat Transfer Regulating Apparatus

A removable flame heat transfer regulating apparatus was made of a metal sheet following the illustration which is disclosed for the embodiment 100 of the present invention, comprising an inner circularly arcuate hollow shell 102 and an outer square wall 130. The inner hollow shell 102 was comprised of a top circumference 110 having a diameter of approximately 19.2 cm, a bottom circumference 112 having a diameter of approximately 7.3 cm, and a height of 3 cm between the top and bottom circumferences.

Two groups of air passages 116 of openings were drilled to penetrate through the inner hollow shell 102 with a diameter of approximately 6 mm for each air passage 116. The air passages 116 in the first group were circumferentially spaced apart along an upper circumference 118 having a diameter of approximately 18.2 cm that is adjacent to the top circumference 110, wherein the upper circumference 118 was 1 cm lower than the top circumference 110, and two adjacent passages 116 were separated with approximately 3 cm. The air passages 116 in the second group were circumferentially spaced apart along a lower circumference 120 having a diameter of approximately 15 cm, wherein the lower circumference 120 was positioned approximately 0.7 cm higher than the bottom circumference 120 which is positioned. In the second group, two adjacent air passages were separated with approximately 1.5 cm.

The outer square wall 130 was constructed as illustrated in FIG. 4, comprising four identical upward plates 132 which were connected to one another. Each upward plate 132 had a length of 21 cm and a height "H2" of 4.2 cm. An extension 146 had a top end 152 of 4 cm and identical first and second upward sides 148 and 150 with a height "H3" of 1.8 cm. The extension 146 was positioned upwardly at the center of a top transverse edge 138 of each upward plate 132. Therefore, the maximum height of the upward plate 132 was 6 cm.

A plurality of air passages 144 of openings having a diameter approximately 5 mm were evenly located to each identical plate 132. The air passages 144 were constructed, which formed a matrix pattern having twelve columns and three rows on each identical upward plate 132. In addition, attachments 162, 164, 163 and 165 were constructed according to the illustration of FIG. 4. Two identical optional utensil supports 154 and 156 were affixed to the outer square wall 130, which were made with round iron rods for supporting a small utensil.

(2) Installation of the Removable Flame Heat Transfer Regulating Apparatus onto the Gas Stove Cooktop A gas stove cooktop having a recessed surface was used for the experiments, which was similar to the cooktop illustrated in FIG. 2. The cooktop contained upper sections of the respective four gas burners with the sealed gas burner assemblies and two extended removable grates. For positioning the upper section of each gas burner on the recessed surface of the cooktop, there is an upward round protrusion as a part of the recessed surface, wherein a neck of the burner upper section was positioned at the center of the round protrusion having an approximately diameter of 12 cm and a height of 1 cm. The two extended grates were extended from the front to the rear of the cooktop. Each of which was placed over a front gas burner and a rear gas burner to support two utensils. The height was 6 cm from the top of the grate to the recessed surface of the cooktop, which was equal to the maximum height of each identical upward plate 132 of the outer square wall 130.

After removing the right side extended gate, the inner hollow shell 102 at its bottom circumference 112 was positioned onto the round protrusion to surround the upper section 178 of a right front gas burner. The outer square wall 130 was then positioned onto the recessed surface of the cooktop 166 to surround the inner hollow shell 102, wherein the installation was exactly followed by the illustration in FIG. 5. The height of the burner cap 180 was 1 cm above the round protrusion, which was lower than the 3 cm height of the top circumference 110 of the inner hollow shell 102 relative to the round protrusion. In addition, the top circumference 110 of the inner hollow shell 102 had a height of 4 cm relative to the recessed surface of the cooktop 166, and was positioned lower than the top square transverse edge 138 of the outer square wall 130, which had a height of 4.2 cm.

(3) Experimental Conditions a. References and Tested samples: times needed to boil an amount of water were served as References from using the commercial cooktop as illustrated in above section (2). The water was retained inside of a cooking utensil which was placed on the top of the extended grate of the commercial cooktop. Times needed to boil the same amount of water from the setting as illustrated in FIG. 5 of the present invention were served as the Tested samples, wherein the water was retained inside of the same utensil. The Tested samples were compared with the References from which to judge if the present invention achieved the scope of an increased heating efficiency in cooking.

b. Combustible gas flow rates: The right-front burner on the cooktop was chosen for the experiments. A minimum gas flow rate was used to produce a weak flame according to a mark "LO" of the commercial cooktop. The mark "LO" is an indication of the maximum turning angle of a gas control knob of the commercial gas stove. The weak flame was kept to burn when the experiments were idle. Using this procedure, the gas burner including the surrounding area of the cooktop was kept to be the same temperature before testing the References and Tested samples. In testing, a medium turning angle of the gas flow rate control knob was used according to a mark "5". An additional sign of an arrow was drawn on the knob for precisely aligning with the mark "5" on the cooktop. Therefore, a consistent turning angle was used in the experiments, which results in the same gas flow rate for generating the flame to obtain the References and Tested samples. In addition, the experiments were taken place after 10 p.m. of the night in the same day so that variation on the supplied pressure of the city combustible gases was considered to be minimal.

c. Testing medium: the tap water was used as the testing medium. The water which was collected into first, second and third large containers was stored in a storage room at least 24 hours before the experiment. The purpose of the water storage is for equalizing the temperature of the water in the three containers, when the water was initially collected from the tap water. The temperature of the water in the three containers was measured multiple times during the entire experiments before the water was used.

The tap water was collected into the three big containers for the following purposes. The water in the first big container was for first equalizing the temperature of an empty utensil which was used as the water container in the experiments. In a process to equalize the temperature of the utensil, the empty utensil was first rinsed by the running tap water, and second was submerged into the water of the first container for a while. After that, the water inside of the utensil was completely poured out, which was poured back to the first container for a reuse purpose in the entire experiments. The water in the second big container was for second equalizing the temperature of the empty utensil. After twice of equalizing the temperature, the utensil was used for collecting the water which was retained in the third extra large container. The water inside of the utensil was going to be heated in the experiment.

d. Utensil: two utensils were used in the tests. The first one was a standard stainless steel round tea kettle having a flat bottom with a diameter of approximately 19.3 cm. The kettle had a steam whistle at the top of a mouth of the kettle connected to the kettle body. The kettle was chosen to represent a small utensil. In testing, the kettle was placed on the top of the optional utensil supports as illustrated in FIG. 3. When measuring an amount of the collected water, the kettle filled up with the water was first placed on a horizontal surface, and then the amount of the water inside of the kettle was adjusted from adding in or pulling out according to a top water level which reached the mark of a joint line where the mouth was affixed to the body of the kettle. The second one was a big aluminum pot with a glass top cover, which was used to represent a large utensil. The pot had a cylindrical body with a diameter of approximately 23.5 cm. When in use of the pot, the equal amount of water was first measured from using the kettle. Then the inside water was completely poured into the big pot.

e. Order of the testing: First test: the amount of water in the small kettle was heated where the kettle was placed on the flame heat transfer regulating apparatus having the optional utensil supports from the present invention. Second test: the same amount of water in the same kettle was heated wherein the kettle was placed on the expended grate of the commercial gas stove cooktop as illustrated in Section (2). Third test: the same amount of water which was placed in the big pot was heated while using the commercial cooktop setting. Fourth test: the same amount of water in the same big pot was heated when the big pot was placed on the flame heat transfer regulating apparatus from the present invention.

f. Times determined for boiling the water: when using the small round kettle, the times for boiling the water were determined according to an early moment that the steam whistle sounded loudly. When in use of the big pot, the times were determined that a loud sound of the boiling water was recognized.

(4) Testing Results:

TABLE 1

Testing results for the Tested Samples (Sample) and References (Ref.)

| Test | Test Subject | Cookware | Times (min.) | Difference to Ref. | % to Ref. | Efficiency |
|---|---|---|---|---|---|---|
| 1 | Sample | Kettle | 19.75 | −4.50 (min.) | 81.44% | +18.56% |
| 2 | Ref. | Kettle | 24.25 | | | |
| 3 | Ref. | Big Pot | 24.67 | | | |
| 4 | Sample | Big Pot | 21.08 | −3.59 (min.) | 85.44% | +14.56% |

Table 1 lists the testing results of each category which is illustrated above. The results demonstrate that at least more than 14.6% of the increased heating efficiency in cooking are achieved with applying both smaller and larger utensils in application of the apparatus of the present invention, as compared with the times needed for the commercial cooktop to boil the same amount of the water. The results of the increased heating efficiency demonstrate importance of regulating transfer of the flame heat radiation and heat conviction including the air convection for saving the thermal energies in cooking. Therefore, the teaching from the test results is consistent with the spirit and scope of the present invention. In addition, the testing results also demonstrate that application of the present invention removal flame heat transfer regulating apparatus significantly reduces consumption of the combustive gas and production of the greenhouse gases.

In the above disclosures of the present invention, the first and second embodiments 100 and 200 of the removable flame heat transfer regulating apparatus are illustrated for the gas stove cooktop having the sealed burner mounting assembly. However, it would be appreciated that the present invention is also appropriate for the gas stove cooktop having the opened burner mounting assembly. In addition, from the spirit and scope of the present invention, the outer wall 130 or 230 can be an extended one, which extends to surround two side-by-side gas burners of the stove cooktop.

It would be further appreciated that from the spirit and scope of the present invention, the inner hollow shell 102 or 202 and the respective outer wall 130 or 230 can be an integrated one.

In the configuration for the integrated inner hollow shell 102 and outer square wall 130, the top circumference 110 of the inner hollow shell 102 is simultaneously affixed to each of four upward plates 132 of the outer square wall. One embodiment of the affixation takes place at a position 137 on the interior side 136 of each upward plate 132, as illustrated in FIG. 4. The position 137 is aligned with the middle position of the upward plate 132 and a position which is slightly lower than the top edge 138 of the upward plate. Therefore, the rotational axis 114 of the inner hollow shell 102 and the symmetric axis 142 of the outer square wall 130 are in alignment. It would be appreciated that after affixation, in one embodiment both the inner hollow shell 102 and the outer square wall 130 of the integrated apparatus can be stood on the cooktop. However in another embodiment, only the outer square wall of the integrated apparatus is designed to stand on the cooktop.

For integrating the inner hollow shell 202 and the outer circular wall 230 together according to one of various ways of affixation, the top circumference 210 of the inner hollow shell 202 is affixed to an upper circumference of the outer circular wall 230. The upper circumference is positioned on the interior side 236 of the outer circular wall 230 in parallel with but slightly lower than the top circumference 238. Therefore, the rotational axis 214 of the inner hollow shell 202 and the symmetric axis 242 of the outer circular wall 230 are aligned together.

It would be appreciated that other embodiments are also appropriate for integration of the inner hollow shell 202 and outer circular wall 230, which are the same as the disclosed embodiments for integrating the inner hollow shell and outer square wall 130.

Based on the integrated models which are illustrated above, a further structural variation of the integrated models can be conducted.

One embodiment will be that the outer wall 130 or 230 is reduced to be a plurality of identical members, which each member has functions to support a utensil, prevent undesirable heating a utensil handle, and provide a pathway for hot gases to flow outwardly and upwardly. Under this principle, for example, the outer square wall 130 or the outer circular wall 230 can be reduced to comprise at least three identical upward strips, which are evenly spaced apart to affix to the inner hollow shell. Each strip has a width which is the same as the length of the top end 152 of the extension 146. In addition, each strip has a height which is the same height as the maximum height of the upward plate 132. Therefore, a bottom end of each of at least three strips stands on the cooktop of the gas stove, and a top end supports the utensil and prevents undesirable heating a utensil handle in cooking.

In another structural variation of the outer wall 130 or 230, four or at least three of the above illustrated identical upward strips serving as the utensil supports can be used to have the function of the corresponding extensions 146 or 246, wherein the extensions 146 or 246 are omitted. These strips can be removably affixed to the corresponding exterior sides 134 of the plates or exterior side 234 of the circular wall with application of fasteners. In addition, referring to the above described strips and optional utensil supports illustrated in FIGS. 4A and 4B, further variations can be realized that the above discussed strips at the top ends are combined with transverse or descending members to serve as the respective utensil supports for supporting a small utensil. These structural variations are obvious to a person having the ordinary skill in the art, therefore they will not be illustrated for reducing length of this application.

Furthermore, it would be appreciated that, the present invention removable flame heat transfer regulating apparatus is only comprised of the circularly arcuate hollow shell. Under this structural configuration, the hollow shell is positioned on the cooktop to surround the upper section of a gas burner, and the commercial grate is used to support the utensil where the hollow shell is positioned under the grate or the top of the grate.

(II) Removable Apparatus Having an Outer Wall and Improved Inner Hollow Shell

Figure 8:
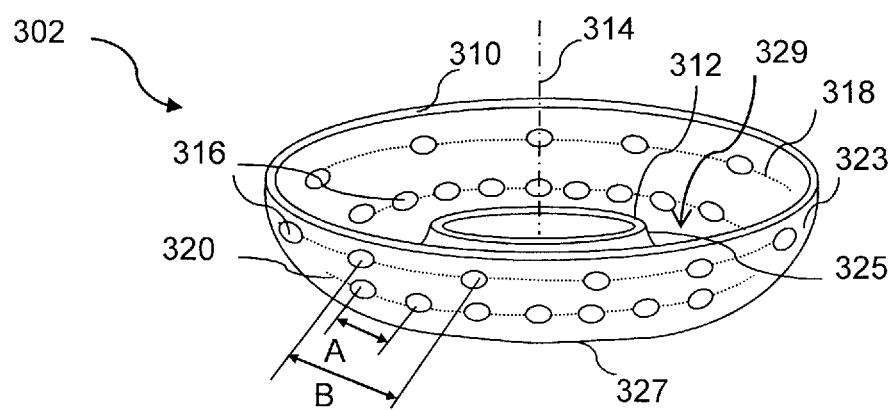
FIG. 8 is a perspective view of an improved inner hollow shell of the present invention.
Figure 9:
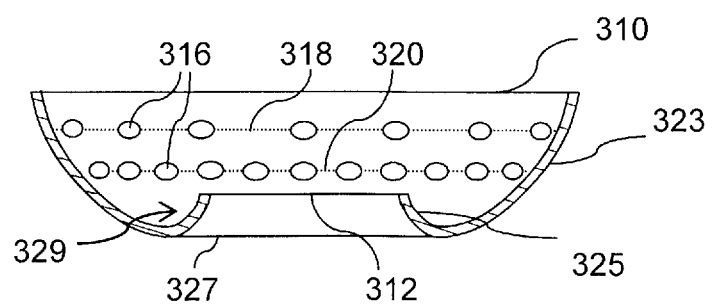
FIG. 9 is a diametrical cross-section view of the improved inner hollow shell illustrated in FIG. 8.

Referring to FIGS. 8 and 9, there is illustrated improved inner hollow shell 302 of the present invention which possesses a dual function to regulate the flame heat transfer and retain dripping liquid substance, as compared with the above described one 102 having a single function of regulating the flame heat transfer, wherein the dripping liquid substance includes liquid or liquid mixture which is dripped from a cooking utensil in cooking.

It would be also appreciated that the improved inner hollow shell 302 can be independently applied to a gas stove, or incorporated with the outer wall 130 or 230 including its variations disclosed above to thereby be applied to a gas stove.

The improved inner hollow shell is a closed hollow member in a symmetrical including circular shape. In a preferred embodiment 302, it is a circular hollow member, which is comprised of a circular outer section 323 having a body and a circular outer edge 310 which surrounds a larger opening, and a circular inner section 325 having a circular inner edge 312 which surrounds a smaller opening. The outer section 323 from the outer edge extends downwardly and inwardly to connect to the inner section 325 which from the inner edge extends downwardly and outwardly to connect to the outer section, thereby forming a bottom circumference 327 and a circular valley 329 of space of the improved inner hollow shell 302. Therefore, the circular outer section 323 is configured to be concave if viewing it along a direction from a rotational axis 314 of the member. In a more preferred embodiment the outer section 323 is circularly parabolic in shape.

As illustrated, the circular outer edge 310 is larger than the circular inner edge 312, where both edges are relative to the rotational axis 314 of the improved inner hollow shell 302. In addition, the outer edge 310 is positioned significantly higher than the inner edge 312 which is positioned. Further referring to FIG. 5, when the inner hollow shell 102 is replaced by the improved inner hollow shell 302 which is positioned to surround the upper section 178 of the burner, the second edge 312 is positioned to be lower than the burner gas ports 182 which are positioned, and kept appropriate distance to the burner, wherein the burner upper section 178 penetrates through the smaller opening surrounded by the circular inner edge 312.

Referring to FIGS. 8 and 9 again, similar to situation of the previously illustrated openings 116 of the inner hollow shell 102, a plurality of openings 316 served as air passages penetrate through the body of the circular outer section 323 of the improved inner hollow shell 302, wherein the openings 316 are divided into first and second groups as an example. The openings 316 in the first group are circumferentially spaced apart to align with an upper circumference 318 at an upper part of the body which is adjacent to the outer edge 310. The openings 316 in the second group are also circumferentially spaced apart to align with a lower circumference 320 at a lower part of the body wherein the lower circumference is positioned to have appropriate distance to the bottom circumference 327.

As additionally illustrated, the openings 316 are greater in quantity and are more densely located to the lower part of the body, as compared with the openings 116 which are fewer in quantity and are less densely located to the upper part of the body of the outer section 323.

With all above illustrated structural characteristics, the improved inner hollow shell 302 realizes the first function to regulate the flame heat transfer as does the inner hollow shell 102 which is described previously, where the regulated heat includes the radiated and convected heat.

It would be appreciated that for reaching the second function when applying the improved inner hollow shell 302 there are no openings located to the circular inner section 325. In addition, there are no openings located to a circular area of the body of the circular outer section 323, wherein the area is defined as from the bottom circumference 327 to a circumference that is positioned to be lower than the lower circumference 320, and have a distance greater than at least a half of the radius of the opening 316 to the lower circumference 320, so that the valley 329 of space formed with the inner section 325 and circular area of the outer section 323 can retain the dripping liquid substance in cooking.

It would be additionally appreciated that an exact volume of the disclosed circular valley must be carefully considered so that the valley can hold appropriate amount of the dripping liquid substance in case happened in cooking when designing the improved inner hollow shell 302 in use.

Figure 12:
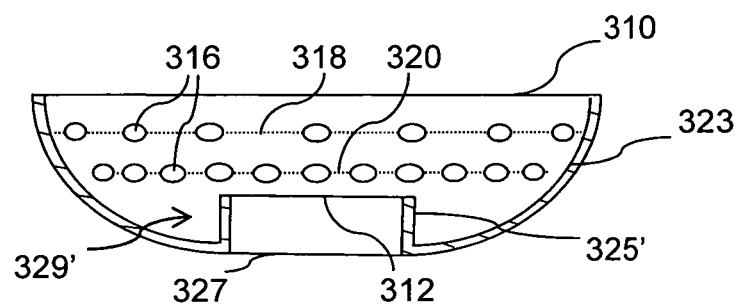
FIG. 12 is a cross sectional view of an improved inner hollow shell wherein a second section is downwardly and vertically extended to thereby be connected to a first section.

In variation of the embodiment 302 of the improved inner hollow shell, referring to FIG. 12, an inner section 325' is downwardly and vertically extended to connect to the downwardly and inwardly extended outer section 323, which forms a circular valley 329' of space for the improved inner hollow shell to retain the dripping liquid substance.

Based on the above disclosed embodiments, the improved inner hollow shell can be broadly defined as a closed hollow member which is composed of a first section having a first edge which surrounds a first opening, and a second section having a second edge which surrounds a second opening, wherein the first edge is larger than further positioned higher than the second edge, and the first opening is larger than the second opening. The first section is connected to the second section thereby forming a bottom and a valley of space. In addition, multiple openings are non-evenly located to a body of the first section, wherein more openings are densely located to a low part of the body.

It would be appreciated that the previously disclosed structural features for the inner hollow shell 102 or 202 are also appropriate to the improved inner hollow shell 302, wherein the features include metal materials, surface treatment, symmetrical shapes, and additionally added beads or rims.

Figure 10:
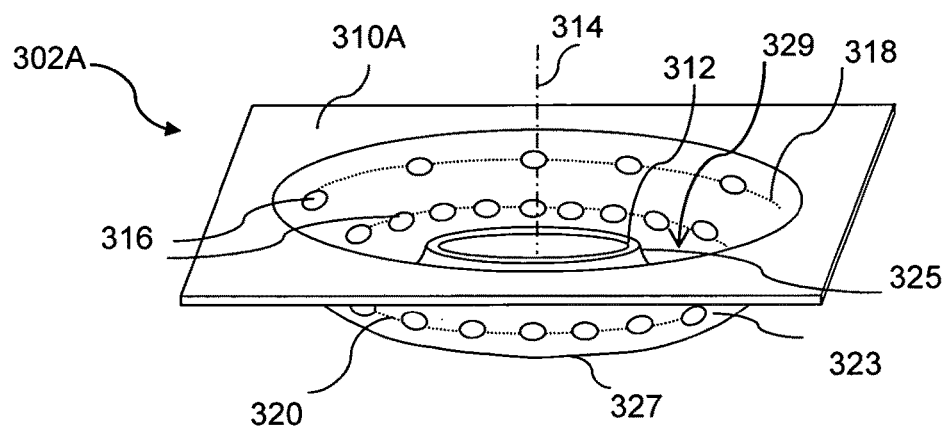
FIG. 10 is a perspective view of an improved inner hollow shell with a plated transverse member in a square shape.
Figure 11:
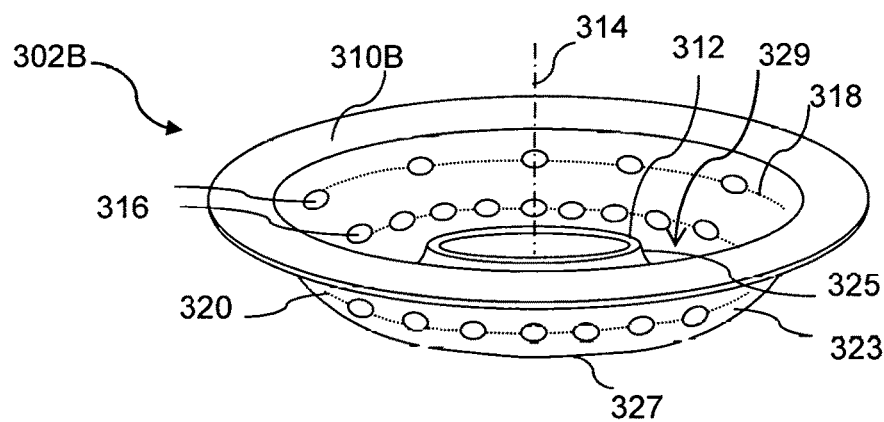
FIG. 11 is a perspective view of an improved inner hollow shell with a plated transverse member in a round shape.

Specifically in another embodiment, a rolled bead is positioned to the inner edge 312 to enhance the mechanical strength of the member. Furthermore referring to FIG. 10 or 11, a transverse plated member in a square shape 310A or round shape 310B is added to the outer edge 10 of the outer section 323 for achieving outwardly extended transverse surface area of an improved inner hollow shell 302A or 302B, so that a large area of the cooktop can be kept clean since the dripping liquid substance or any substance including food debris happened in cooking can be intercepted by such improved inner hollow shell having the extended transverse surface. It would be further appreciated that the a full area of the cooktop can be covered if the area of the extended transverse surface of the transverse plated member is the same as the area of a half of the extended removable grate 40 illustrated in FIG. 2, where four improved inner hollow shells are applied.

If the outer wall 130 or 230 is combined with the above illustrated improved inner hollow shell having the extended transverse surface, its top edge 138 or 238 is positioned to be lower than the plated member, and the extensions 146 or 246, or the independent utensil supports illustrated above penetrate through the transverse plated member. It would be appreciated that these structural variations are obvious to a person having the ordinary skill in the art, therefore a detailed illustration will not be repeated.

In terms of structural variation on materials used for manufacturing the apparatus, it would be appreciated that ceramics is also an appropriate choice, such as alumina, silicon carbide, silicon nitride, titanium carbide, magnesium oxide and silicon dioxide, or any their combinations. This is because ceramics has the excellent thermal properties including high melting point, large heat capacity, low thermal conductivity and low thermal expansion, mechanical properties including hardness and compressive strength, and durability including resistance to corrosion. In addition, the fracture toughness can be largely improved by implementing the fiber enhanced manufacturing process, which forms the fiber enhanced ceramics. These properties of the ceramics fit the material requirements for manufacturing the apparatus.

Therefore, it would be positive for maintaining high temperature in the space under a cooking utensil if the apparatus including the inner hollow shell 102 or 202 or the improved inner hollow shell 302 and outer wall 130 or 230 is made of the ceramics particularly due to its large heat capacity and low thermal conductivity. This is also advantageous to the object of achieving high heating efficiency in cooking from the present invention.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An apparatus for a cooktop of a gas stove including a gas burner and a corresponding grate positioned in a transverse orientation, comprising:
   a. a closed hollow member in a circular shape having a circular outer section including a body and a circular outer edge which surrounds a larger opening, and a circular inner section having a circular inner edge which surrounds a smaller opening, said outer section from said outer edge extends downwardly and inwardly to connect to said inner section which from said inner edge extends downwardly and outwardly to connect to said outer section thereby forming a bottom circumference and a circular valley of space of said hollow member, said outer edge is larger than said inner edge, said outer edge is positioned higher than said inner edge, a plurality of identical openings serving as air passages penetrating through upper and lower parts of said body of said outer section, wherein said openings are greater in quantity and are more densely located to said lower part of said body, as compared with said openings which are fewer in quantity and are less densely located to said upper part of said body;
   d. said hollow member is positioned onto said cooktop of said gas stove to surround an upper section of said gas burner which includes a plurality of gas ports, wherein said circular outer edge of said outer section is positioned under said grate, said circular inner edge of said inner section is positioned lower than said gas ports which are positioned, and to have a distance to said burner; and
   e. said outer section of said hollow member concentrates heat including a convected heat and a radiated heat of a flame onto a cooking utensil which is positioned on said grate to thereby increase heating efficiency of said flame in cooking, said valley of said hollow member retains a dripping liquid substance which is dripped from said utensil in cooking thereby being easily to maintain said cooktop clean.

2. The apparatus in accordance with claim 1, wherein said outer section is circularly parabolic in shape.

3. The apparatus in accordance with claim 1, wherein surface of said hollow member is one of ceramic surface, chemically treated surface and electrochemically treated surface.

4. The apparatus in accordance with claim 3, wherein said surface is in the preferred color white or black.

5. The apparatus in accordance with claim 1, wherein said hollow member is made of ceramics including fiber enhanced ceramics.

6. The apparatus in accordance with claim 1, further comprising: a transverse plated member is positioned at said outer edge to extend area of a transverse surface of said hollow member.

7. An apparatus for a cooktop of a gas stove including a gas burner and a corresponding grate positioned in a transverse orientation, comprising:
   a. a closed hollow member in a circular shape having a circular outer section including a body and a circular outer edge which surrounds a larger opening, and a circular inner section having a circular inner edge which surrounds a smaller opening, said outer section from said outer edge extends downwardly and inwardly to connect to said inner section which from said inner edge extends downwardly and vertically to connect to said outer section thereby forming a bottom circumference and a circular valley of space of said hollow member, said outer edge is larger than said inner edge, said outer edge is positioned higher than said inner edge, a plurality of identical openings serving as air passages penetrating through upper and lower parts of said body of said outer section, wherein said openings are greater in quantity and are more densely located to said lower part of said body, as compared with said openings which are fewer in quantity and are less densely located to said upper part of said body;
   b. said hollow member is positioned onto said cooktop of said gas stove to surround an upper section of said gas burner which includes a plurality of gas ports, wherein said circular outer edge of said outer section is positioned under said grate, said circular inner edge of said inner section is positioned lower than said gas ports which are positioned, and to have a distance to said burner; and
   c. said outer section of said hollow member concentrates heat including a convected heat and a radiated heat of a flame onto a cooking utensil which is positioned on said grate to thereby increase heating efficiency of said flame in cooking, said valley of said hollow member retains a dripping liquid substance which is dripped from said utensil in cooking thereby being easily to maintain said cooktop clean.

8. The apparatus in accordance with claim 7, wherein said outer section is circularly parabolic in shape.

9. The apparatus in accordance with claim 7, wherein surface of said hollow member is one of ceramic surface, chemically treated surface and electrochemically treated surface.

10. The apparatus in accordance with claim 9, wherein said surface is in the preferred color white or black.

11. The apparatus in accordance with claim 7, wherein said hollow member is made of ceramics including fiber enhanced ceramics.

12. The apparatus in accordance with claim 7, further comprising: a transverse plated member is positioned at said outer edge to extend area of a transverse surface of said hollow member.

13. An apparatus for a cooktop of a gas stove including a gas burner and a corresponding grate positioned in a transverse orientation, comprising:
   a. a closed hollow member including a first section having a body and a first edge which surrounds a first opening, and a second section having a second edge which surrounds a second opening, wherein said first edge is larger than said second edge, which is further positioned higher than said second edge, and said first opening is larger than said second opening, said first section is connected to said second section thereby forming a bottom and a valley of said hollow member, a plurality of identical openings penetrating through upper and lower parts of said body of said first section, wherein said openings are greater in quantity and are more densely located to said lower part of said body, as compared with said openings which are fewer in quantity and are less densely located to said upper part of said body;
   b. said hollow member is positioned onto said cooktop of said gas stove to surround an upper section of said gas burner which includes a plurality of gas ports, wherein said first edge of said first section is under said grate, said second edge of said second section is lower than said gas ports and has a distance to said gas burner; and
   c. said first section of said hollow member concentrates heat of a flame onto a cooking utensil which is positioned onto said grate to thereby increase heating efficiency of said flame in cooking, said valley of said hollow member retains a dripping liquid substance which is dripped from said utensil thereby being easily to maintain said cooktop clean.

14. The apparatus in accordance with claim 13, wherein said hollow member is symmetrical.

15. The apparatus in accordance with claim 13, wherein said hollow member is circular in shape and said first section is circularly concave in shape.

16. The apparatus in accordance with claim 15, wherein said first section is circularly parabolic in shape.

17. The apparatus in accordance with claim 13, wherein surface of said hollow member is one of ceramic surface, chemically treated surface and electrochemically treated surface.

18. The apparatus in accordance with claim 17, wherein said surface is in the preferred color white or black.

19. The apparatus in accordance with claim 13, wherein said hollow member is made of ceramics including fiber enhanced ceramics.

20. The apparatus in accordance with claim 13, further comprising: a transverse member is positioned at said first edge to extend a transverse surface of said hollow member.

* * * * *